US005425496A

United States Patent [19]

Zhu et al.

[11] Patent Number: 5,425,496

[45] Date of Patent: Jun. 20, 1995

[54] METHOD FOR JOINING CERAMIC AND METAL-CERAMIC HEATING ELEMENTS TO ELECTRICAL TERMINALS BY MICROPYRETIC SYNTHESIS, COMPOSITIONS FOR ELECTRICAL TERMINALS AND HEATERS COMPRISING THE SAME

[75] Inventors: Naiping Zhu; Jainagesh A. Sekhar, both of Cincinnati, Ohio

[73] Assignee: University of Cincinnati, Cincinnati, Ohio

[21] Appl. No.: 310,219

[22] Filed: Sep. 21, 1994

Related U.S. Application Data

[60] Continuation of Ser. No. 197,166, Feb. 16, 1994, abandoned, which is a division of Ser. No. 28,354, Mar. 9, 1993.

[51] Int. Cl.[6] .............................................. B23K 23/00

[52] U.S. Cl. ................................ 228/234.3; 228/198; 228/179.1

[58] Field of Search .................. 228/179.1, 198, 234.1, 228/234.3

[56] References Cited

U.S. PATENT DOCUMENTS

| | | | |
|---|---|---|---|
| 3,090,094 | 5/1963 | Schwartzwalder et al. | 25/156 |
| 3,097,930 | 7/1963 | Holland | 25/156 |
| 3,111,396 | 11/1963 | Ball | 25/156 |
| 3,314,876 | 4/1967 | Ransley | 204/291 |
| 3,330,756 | 7/1967 | Ransley | 204/279 |
| 3,608,599 | 9/1971 | Spear | 150/33 |
| 3,617,358 | 11/1971 | Dittrich | 117/105.2 |
| 3,668,599 | 6/1972 | Schrewelius | 338/289 |
| 3,705,791 | 12/1972 | Bredzs | 29/195 |
| 3,726,643 | 4/1973 | Merzhanov et al. | 423/409 |
| 3,872,419 | 3/1975 | Groves et al. | 338/25 |

(List continued on next page.)

FOREIGN PATENT DOCUMENTS

| | | |
|---|---|---|
| 0164830 | 12/1985 | European Pat. Off. . |
| 0258510 | 9/1986 | European Pat. Off. . |
| 0404943 | 1/1991 | European Pat. Off. . |
| 1096063 | 4/1989 | Japan . |
| 584052 | 12/1977 | U.S.S.R. . |
| 9003956 | 4/1990 | WIPO . |
| 9013513 | 11/1990 | WIPO . |

OTHER PUBLICATIONS

J. W. McCauley et al. "Simultaneous Preparation . . . ", Ceramic Engineering, 3 (1982), pp. 538–554.

R. W. Rice et al. "Effects of Self–Propagating . . . " Ceramic Engineering, 7 (1986), pp. 737–749.

H. C. Yi, et al. "Self–Propagating High–Temperature (Combustion) Synthesis (SHS) of Powder–Compacted Materials" Journal Materials Science, 25 (1990) pp. 1159–1168.

C. H. Samans "Powder Metallurgy", American Society For Metals, Metals Handbook, 1948, pp. 47–52.

Subrahmanyam et al., Review: Self–Propagating High––Temperature Synthesis. J. Mabo Sci., vol. 27, (992, pp. 6249–6273).

*Primary Examiner*—Samuel M. Heinrich
*Attorney, Agent, or Firm*—Frost & Jacobs

[57] ABSTRACT

A method for joining a ceramic or metal ceramic electrical heating element to a electrical terminal is disclosed, the heating element having been manufactured using micropyretic synthesis, the method for joining comprising the steps of preparing the electrical terminal by blending a combustible mixture and fashioning the mixture into a desired wet and uncombusted shape for the terminal, attaching the terminal to the element, drying the terminal portion of the terminal-element attachment and combusting the terminal portion of said terminal-element attachment by ignition at a temperature between about 150° C. and 1800° C. An electrical terminal is disclosed, the terminal having been formed by micropyretic synthesis of a specific combustible composition. A heating element assembly for a heater is disclosed comprising a first and a second ceramic or metal ceramic electrical terminals, a plurality of ceramic or metal ceramic heating element and a plurality of ceramic or metal ceramic coolers which are used to connect said plurality of heating elements to each other.

7 Claims, 2 Drawing Sheets

U.S. PATENT DOCUMENTS

| | | | |
|---|---|---|---|
| 3,872,419 | 3/1975 | Groves et al. | 338/25 |
| 3,969,696 | 7/1976 | Wolfe et al. | 219/541 |
| 4,003,014 | 1/1977 | Branson et al. | 338/326 |
| 4,193,106 | 3/1980 | Coleman | 361/275.4 |
| 4,193,106 | 3/1980 | Coleman | 361/275 |
| 4,202,691 | 5/1980 | Yurasko, Jr. | 75/252 |
| 4,217,948 | 8/1980 | Merzhanov et al. | 164/115 |
| 4,267,435 | 5/1981 | Best | 219/552 |
| 4,459,363 | 7/1984 | Holt | 501/96 |
| 4,610,726 | 9/1986 | King | 75/233 |
| 4,655,830 | 4/1987 | Akashi et al. | 75/233 |
| 4,710,348 | 12/1987 | Brupbacher et al. | 420/129 |
| 4,738,389 | 4/1988 | Moshier et al. | 228/198 |
| 4,747,873 | 5/1988 | Kamioka | 74/229 |
| 4,751,048 | 6/1988 | Christodoulou et al. . | |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/129 |
| 4,808,372 | 2/1989 | Koczak et al. | 420/457 |
| 4,836,982 | 6/1989 | Brupbacher et al. | 420/129 |
| 4,877,759 | 10/1989 | Holt et al. | 501/96 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |
| 4,915,903 | 4/1990 | Brupbacher et al. | 429/128 |
| 4,915,905 | 4/1990 | Kampe et al. | 420/418 |
| 4,948,761 | 8/1990 | Hida | 501/89 |
| 4,957,885 | 9/1990 | Hida | 501/89 |
| 4,965,044 | 10/1990 | Miyamoto et al. | 419/12 |
| 4,975,412 | 12/1990 | Okazaki et al. | 505/1 |
| 4,985,202 | 1/1991 | Moshier et al. | 420/590 |
| 4,988,480 | 1/1991 | Merzhanov et al. | 419/11 |
| 4,988,645 | 1/1991 | Holt et al. | 501/91 |
| 4,990,295 | 2/1991 | Hida | 264/65 |
| 4,999,144 | 3/1991 | Miyamoto | 564/56 |
| 5,006,290 | 4/1991 | Hida | 264/65 |
| 5,011,800 | 4/1991 | Abramovici et al. | 501/96 |
| 5,019,454 | 5/1991 | Busse | 428/570 |
| 5,022,991 | 6/1991 | Day et al. | 210/506 |
| 5,030,600 | 7/1991 | Hida et al. | 501/98 |
| 5,032,532 | 7/1991 | Hida et al. | 214/65 |
| 5,071,797 | 12/1991 | Hida | 501/87 |
| 5,110,688 | 5/1992 | Sekhar et al. | 428/552 |
| 5,143,668 | 9/1992 | Hida | 264/63 |
| 5,145,619 | 9/1992 | Abramovici | 264/60 |
| 5,149,677 | 9/1992 | Merzhanov et al. | 502/96 |
| 5,169,572 | 12/1992 | Matthews | 264/27 |
| 5,188,678 | 2/1993 | Sekhar et al. | 148/514 |
| 5,198,188 | 3/1993 | Holt et al. | 419/45 |
| 5,213,730 | 5/1993 | Hida | 264/63 |
| 5,217,583 | 6/1993 | Sekhar et al. | 204/67 |
| 5,221,647 | 6/1993 | Hida | 501/98 |
| 5,310,476 | 5/1994 | Sekhar et al. | 205/230 |
| 5,316,718 | 5/1994 | Sekhar . | |
| 5,340,014 | 8/1994 | Sekhar et al. | 204/67 |
| 5,340,448 | 8/1994 | Sekhar et al. . | |

METHOD FOR JOINING CERAMIC AND METAL-CERAMIC HEATING ELEMENTS TO ELECTRICAL TERMINALS BY MICROPYRETIC SYNTHESIS, COMPOSITIONS FOR ELECTRICAL TERMINALS AND HEATERS COMPRISING THE SAME

This is a continuation of application Ser. No. 08/197,166, filed Feb. 16, 1994, now abandoned, which is a divisional, of application Ser. No. 08/028,354, filed Mar. 9, 1993.

FIELD OF THE INVENTION

The present invention provides a novel method for the joining of ceramic and metal-ceramic radiant heating elements to electrical terminals using micropyretic synthesis technology. More specifically, this invention can be used for the joining of $MoSi_2$ heating elements to their terminals. A second aspect of the present invention provides optimal ceramic and metal ceramic compositions for manufacturing electrical terminals which will be especially suited for effecting the micropyretic synthesis based joining techniques described herein. A further aspect of this invention provides a novel arrangement for the design of heaters utilizing the method and compositions disclosed herein.

BACKGROUND OF THE INVENTION

Heating elements normally have to be joined to electrically conducting bodies of sizes that are typically larger than the elements themselves called terminals. Terminals are provided so that while the heating element is being heated by passage of current, the terminal remains cool because its larger cross section enables the terminal to carry a lower current density. This in turn allows for the safe and efficient attachment of leads from the power source to such a terminal; in the absence of which terminals the leads would have to be directly attached to the heating element.

Typical processes of attachment of terminals to ceramic and metal-ceramic heating elements are known to be costly. This high cost enhances the total cost of the use of ceramic and metal-ceramic heating elements in radiant heaters and such other applications. Thus there is a need for novel and less expensive processes to accomplish the task of joining ceramic and metal-ceramic heating elements to terminals.

This problem of attaching terminals to ceramic and metal-ceramic heating elements is known to be especially challenging with respect to heating elements made of molybdenum disilicide ($MoSi_2$), silicon carbide (SiC) and composites thereof. This is because $MoSi_2$ has a high melting point (2020° C.) and because at temperatures above 800° C., in an oxidizing atmosphere, the surface of a $MoSi_2$ element gets covered with $SiO_2$. Hence joining techniques for such elements require high temperatures, normally above 1600° C., and protective atmospheres.

$MoSi_2$ has the following properties that make it an ideal metalceramic for use in applications such as top glass cooking stoves, which utilize a radiant plate placed under a glass ceramic transparent top with the heating element comprising an electrically heated body, supported by an insulating base: (1) The resistivity of $MoSi_2$ increases with temperature. (2) The resistivity-temperature curve for a $MoSi_2$ heating element is very steep, with the resistivity ratio at 20° C. to 1500° C., being about IO. (3) The long time working temperature of $MoSi_2$ elements is well above 1350° C. Hence when a $MoSi_2$ heating element is connected to a constant voltage source, the power required (?) will initially be high at low temperatures. As heating progresses, the power (current × voltage) required decreases as the radiant body temperature increases. The above described resistance-temperature characteristics thus enable a $MoSi_2$ heating element to be heated to above 1350° C. immediately when the power is turned on.

A typical top glass cooking stove assembly when activated emits energy through the glass ceramic thereby heating the bottom surface of a utensil placed directly thereupon. Normal metallic heating elements are not suitable for such an application because of the low surface temperature which is possible to be generated upon the heating of a metallic heating element and also the related slow response to further heating. A much faster response can be obtained by (1) increasing the surface temperature of the radiant heating elements to maximize the radiated energy, and (2) minimizing the thermal mass of the heating bodies in order to reduce the thermal inertia of the system. For the reasons mentioned above, $MoSi_2$ heating elements are being actively considered for such applications. It is to be understood that this possible use of $MoSi_2$ heating elements is provided for purposes of illustration only, and should not be construed to be limiting.

Conventional techniques for joining molybdenum disilicide heating elements to electrical terminals utilize complex and expensive techniques such as electron beams, laser or plasma welding technology, An example is provided in U.S. Pat. 3,668,599 ('599) of Jun. 6, 1972, issued to Niles Gustav Schrewelius. The '599 patent discloses a device which comprises an array of parallel $MoSi_2$ heating resistance element rods coupled in series by connecting adjacent rod ends together in pairs at one end of the array and, at the other end connecting adjacent rods ends together in pairs, staggered with respect to those at the first end. The connection is made by means of a flame-sprayed layer of MoSiAl or $MoSi_2$. The '599 patent utilizes a very high cost, high energy beam machine like a thermal spray gun. The use pf a thermal spray gun is a very slow process. Implementing the '599 patent in a typical manufacturing shop would involve expenditure of considerable time and effort and would also be quite expensive. Similarly the use of an electron beam or laser woud be very expensive.

The novel micropyretic synthesis based techniques and unique compositions disclosed in the present invention will eliminate the above problems associated with prior art techniques for joining $MoSi_2$ radiant heater elements to electrical terminals.

Another problem associated with cooking stove type applications is that the wire diameter used in such applications is typically only about 0.7 to 1 millimeter. The conventional joining techniques, such as the ones described above in the '599 patent, are difficult to implement for such small diameters on account of the brittleness of $MoSi_2$. The present invention will also alleviate this problem by providing the advantage of easy handling, air atmosphere firing (the present invention does not require a special atmosphere during the joining step), instant joining onto the required geometry and shape.

Co-pending application U.S. Ser. No. 07/847,782 ('782) provides a novel technique to make electrical heating elements which may be used up to 1900° C.

New methods are also provided for manufacturing ceramic composites, which may be used as both electrical heating elements and oxidation resistant materials. There are also provided in the '782 application, compositions for manufacturing the above mentioned ceramic composites and heating elements. The '782 application is incorporated by reference into the present application.

While the '782 application provides methods for the manufacture of electrical heating elements and the like, there is no suggestion that this method i.e. micropyretic synthesis would be applicable in joining heating elements produced in accordance with the '782 application to electrical terminals. Also there is no suggestion that electrical terminals can be manufactured using ceramic and metal ceramic compositions.

The present invention also provides a heating element assembly for a radiant heating device, which assembly utilizes the method and compositions of this invention. In general this assembly includes a pair of terminals for connecting the heating element to the source, a plurality of heating elements and a plurality of coolers. The coolers are used to connect the heating elements to each other. The coolers act like intermediate terminals. These intermediate terminals may also be used to connect the heating elements to the surface below so as to provide mechanical support, as they remain cooler than the heating elements themselves.

Thus, the present invention provides a low-cost, novel technique for joining ceramic and metal ceramic heating elements to electrical terminals, which eliminates or alleviates several of the problems associated with prior art techniques. The present invention also provides optimal ceramic and metal ceramic compositions for manufacturing electrical terminals which compositions will be especially suited for effecting the micropyretic synthesis based joining techniques described herein. Finally the present invention provides a heating element assembly for a radiant heating device, which assembly utilizes the method and compositions of this invention.

SUMMARY OF THE INVENTION

It is a primary object of the present invention to provide a method for joining ceramic and metal ceramic heating elements to ceramic and metal ceramic electrical terminals by micropyretic synthesis.

It is another object of the present invention to provide a method for joining ceramic and metal ceramic heating elements to ceramic and metal ceramic electrical terminals, the method being much less expensive than prior art methods.

It is a further object of the present invention to provide a method for joining ceramic and metal ceramic heating elements to ceramic and metal ceramic electrical terminals which method can be successfully and advantageously utilized in joining $MoSi_2$ heating elements to ceramic and metal ceramic terminals.

It is yet another object of the present invention to provide electrical terminals which comprise ceramic and metal ceramic compositions.

A still further object of the present invention is to provide radiant heaters comprising ceramic and metal ceramic heating elements joined to electrical terminals which themselves are also comprised of ceramic and metal ceramic compositions.

Yet another of the present invention is to provide electrical terminals for use in electrical radiant heaters in conjunction with ceramic and metal ceramic heating elements, wherein the terminals themselves are comprised of ceramic and metal ceramic compositions, wherein the terminals can be used effectively in typical applications for at least 4000 hours of continuous use.

It is also an object of the present invention to provide ceramic and metal ceramic electrical terminals which are especially suited for use in typical top glass cooking stove assemblies, wherein the assembly comprises an electrical heating element which when activated emits energy through a glass top, thereby heating the bottom surface of any utensil placed directly thereupon.

It is a further object of the present invention to provide a method for joining ceramic and metal ceramic heating elements to electrical terminals without utilizing complex and expensive techniques such as electron beams, laser or plasma welding technology as shown by the prior art.

It is yet another object of the present invention to provide a method for joining electrical heating elements to electrical terminals, both the heating element and the terminal being a ceramic or a metal ceramic composite, wherein the method of joining allows for extremely small diameter terminals to be joined to heating elements.

It is a still further object of the present invention to provide a method for joining ceramic and metal ceramic heating elements to ceramic and metal ceramic electrical terminals wherein the method does not require a special non-oxidizing atmosphere during the joining step.

It is yet another object of the present invention to provide a method for joining a ceramic or a metal ceramic electrical heating element to a ceramic or a metal ceramic electrical terminal wherein the electrical heating element can be joined to any required geometry and/or shape of the electrical terminal.

It is also an object of the present invention to provide a novel assembly for heating elements for the design of heaters, which assembly results in lower cost because of the use of smaller heating elements.

It is yet another object of the present invention to provide a novel assembly for heating elements for the design of heaters, which assembly allows for flexibility of design by providing for electrical terminals which act as coolers, between consecutive heating elements.

It is a further object of the present invention to provide a novel assembly for heating elements for the design of heaters, which assembly includes ceramic and metal-ceramic electrical terminals, the terminals providing the additional advantage of being capable of attaching the heating element assembly to the substrate.

In accordance with the first aspect of the present invention, there is provided a method for joining a ceramic or metal ceramic electrical heating element to a electrical terminal, the heating elements having been manufactured using micropyretic synthesis, the method for joining comprising the steps of: (1) preparing the electrical terminals by (a) blending a mixture comprising between about 5% and 95% by weight of at least one reactive system, wherein said reactive system comprises at least two particulate combustible materials which will react exothermically with one another by micropyretic synthesis and are present in such proportion to one another that combustion will occur when ignited, upto 95% by weight of a filler material, and a sufficient amount of a liquid phase in order to form a slurry and (b) fashioning said slurry into a desired wet and uncombusted shape for said terminal; (2) placing said heating element into close contact with said wet, uncombusted terminal so as to attach said terminal to said element; (3) drying the terminal portion of the terminal-element attachment; and (4) combusting the terminal portion of said terminal-element attachment by ignition at a temperature between about 150° C. and 1800° C.

In accordance with the second aspect of this invention, there is provided an electrical terminal capable of being used at temperatures up to 1700° C, said terminal having been formed by micropyretic synthesis of a composition, said composition comprising: (a) between about 5% and 95% by weight of at least one reactive system, wherein said reactive system comprises at least two particulate combustible materials which will react exothermically with one another by micropyretic synthesis and are present in such proportion to one another that combustion will occur when ignited; (b) upto 95% by weight of a filler material; and (c) a sufficient amount of a liquid phase in order to form a slurry.

In accordance with the third aspect of the present invention there is provided a heating element assembly for a heating device comprising: a first and a second ceramic or metal ceramic electrical terminal; a plurality of ceramic or metal ceramic heating element structures, at least one of which heating elements is connected by micropyretic synthesis to first said terminal, and at least one of said heating elements different from the heating element connected to first said terminal, being connected to said second terminal; and a plurality of ceramic or metal ceramic coolers which are used to connect said plurality of heating elements to each other, a typical heating element being connected to one end of a cooler by micropyretic synthesis, the second end of said cooler being connected to another heating element by micropyretic synthesis.

These and other objects and aspects of the present invention will become apparent from the following description of the preferred embodiments taken together with the accompanying drawings.

DETAILED DESCRIPTION OF THE PREFERRED EMBODIMENT

Figure 1:
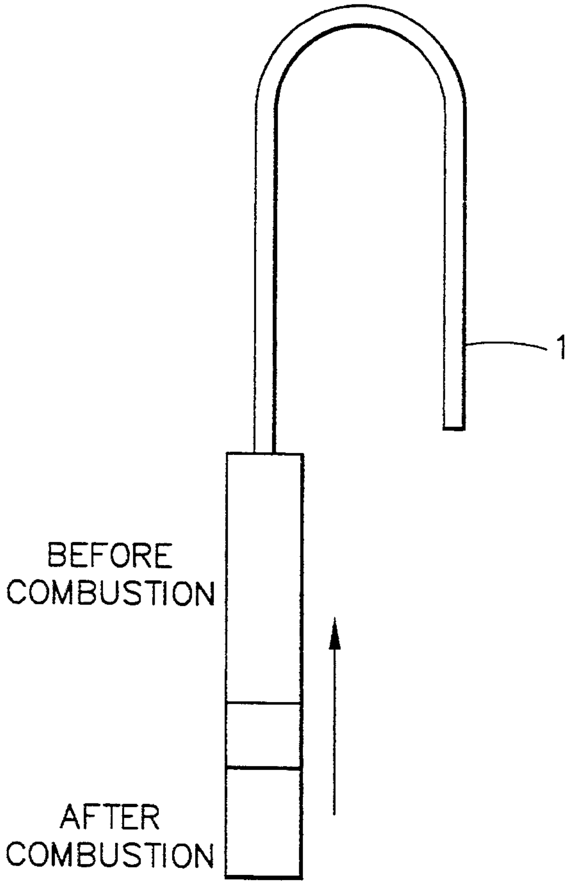
FIG. 1 is a schematic which show progress of combustion after the attachment of the wet, uncombusted heating terminal to the heating element.

As will be evident from the compositions set forth hereinafter, the best known mode of carrying out the invention includes the use of the following compositions, all percentages being by weight.

A. A filler material comprising from about 40% to about 60% $MoSi_2$, from about 0.5% to about 3% silicon carbide, $Y_2O_3$, and $Si_3N_4$; a reactive system comprising from about 20% to about 50% $MoO_3$, aluminum and silicon; and a plasticizer comprising about 2% to about 10% of bentonite.

B. A filler material comprising at least one of from about 20% to about 80% $MoSi_2$, up to about 30% chromium, up to about 15% iron, up to about 6% molybdenum, up to about 2% titanium, up to about 1.2% niobium, up to about 0.7% yttrium, up to about 2.5% aluminum,-up to about 10% silver, up to about 42% silicon carbide, up to about 12% $Y_2O_3$, up to about 2.5% $Al_2O_3$, up to about 8% $SiO_2$, and up to about 2.5% MgO; a reactive system comprising from about 12% to about 35% nickel, and about 3% to about 13% aluminum; and a plasticizer which when present comprises about 8% to about 12% of a 2.5% aqueous chemical cellulose solution.

C. A filler material comprising at least one of from 0% to about 75% $MoSi_2$, about 8% to about 10% $SiO_2$, Up to about 2% silicon, about 0.8% to about 40% silicon carbide, up to about 0.5% boron, up to about 8% $Y_2O_3$, and up to about 2% $Si_3N_4$; a reactive system comprising from about 7% to about 28% $Cr_2O_3$, about 2.5% to about 10% aluminum, and about 0.7% to about 3% carbon; and a plasticizer comprising at least one of from about 4% to about 5% polyvinyl butyral, and about 8% to about 12% of a 2.5% aqueous chemical cellulose solution.

D. A filler material comprising at least one of from about 1% to about 50% silicon carbide, up to about 71% $MoSi_2$, up to about 10% $SiO_2$, up to about 10% $Y_2O_3$, up to about 10% $Si_3N_4$, up to about 0.5% BN, up to about 1% chromium, up to about 1% boron, up to about 0.5% aluminum, up to about 10% $Al_2O_3$, up to about 0.5% silicon, and up to about 7% $ZrO_2$; a reactive system comprising from about 7% to about 30% $MoO_3$, about 2.5% to about 11% aluminum, and about 2.5% to about 38% silicon and up to about 11% carbon; and a plasticizer comprising at least one of from about 10% to about 15% polyvinyl butyral, about 8% to about 15% of a 2.5% aqueous chemical cellulose solution, about 8% to about 10% fused silica and its activator, and about 4% to about 10% bentonite.

E. A filler material comprising at least one of from about to about 40% silicon carbide, about 7% to about 8% $Y_2O_3$, about 1.7% to about 2% $Al_2O_3$, about 7% to about 8% $SiO_2$, and about 1.7% to about 2% MgO; a reactive system comprising from about 25% to about 30% titanium, and about 9% to about silicon; and a plasticizer comprising from about 8% to about of a 2.5% aqueous chemical cellulose solution.

Compositions embodying the invention are as follows, it being understood that these are illustrative and not limiting:

| | Composition A | |
|---|---|---|
| Combustible: | $MoO_3$ | 17.1 (g) |
| | Al | 6.3 (g) |
| | Si | 6.6 (g) |
| Filler: | $MoSi_2$ | 62 (g) |
| | SiC | 1 (g) |
| | $Si_3N_4$ | 1 (g) |
| | Si | 5 (g) |
| Plasticizer: | Bentonite | 6 (g) |
| | Composition B | |
| Combustible: | $MoO_3$ | 17.1 (g) |
| | Al | 6.3 (g) |
| | Si | 6.6 (g) |
| Filler: | $MoSi_2$ | 57 (g) |
| | SiC | 1 (g) |
| | $Si_3N_4$ | 1 (g) |
| | Si | 10 (g) |
| Plasticizer: | Bentonite | 6 (g) |
| | Composition C | |

-continued

| | | |
|---|---|---|
| Combustible: | $MoO_3$ | 17.1 (g) |
| | Al | 6.3 (g) |
| | Si | 6.6 (g) |
| Filler: | $MoSi_2$ | 47 (g) |
| | SiC | 1 (g) |
| | $Si_3N_4$ | 1 (g) |
| | Si | 10 (g) |
| Plasticizer: | Bentonite | 6 (g) |
| | Composition D | |
| Combustible: | $MoO_3$ | 17.1 (g) |
| | Al | 6.3 (g) |
| | Si | 6.6 (g) |
| Filler: | $MoSi_2$ | 45 (g) |
| | SiC | 1 (g) |
| | $Si_3N_4$ | 1 (g) |
| | Si | 15 (g) |
| | $Y_2O_3$ | 2 (g) |
| Plasticizer | Bentonite | 6 (g) |
| | Composition E | |
| Combustible: | $MoO_3$ | 17.1 (g) |
| | Al | 6.3 (g) |
| | Si | 6.6 (g) |
| Filler: | $MoSi_2$ | 50 (g) |
| | SiC | 1 (g) |
| | $Si_3N_4$ | 1 (g) |
| | Si | 10 (g) |
| | $Y_2O_3$ | 2 (g) |
| Plasticizer: | Bentonite | 6 (g) |
| | Composition F | |
| Combustible | Ni | 17.34 (g) |
| | Al | 2.66 (g) |
| Filler | $MoSi_2$ | 80.0 (g) |
| Plasticizer | | 0 |
| | Composition G | |
| Combustible | Ni | 26.0 (g) |
| | Al | 4.00 (g) |
| Filler | $MoSi_2$ | 70.0 (g) |
| Plasticizer | | 0 |
| | Composition H | |
| Combustible | Ni | 34.68 (g) |
| | Al | 5.32 (g) |
| Filler | $MoSi_2$ | 60.0 (g) |
| Plasticizer | | 0 |
| | Composition I | |
| Combustible | Ni | 13.70 (g) |
| | Al | 6.30 (g) |
| Filler | $MoSi_2$ | 80.0 (g) |
| Plasticizer | | 0 |
| | Composition J | |
| Combustible | Ni | 15.00 (g) |
| | Al | 7.05 (g) |
| Filler | $MoSi_2$ | 70.00 (g) |
| | Cr | 5.25 (g) |
| | Mo | 0.60 (g) |
| | Ti | 1.70 (g) |
| | B | 0.40 (g) |
| Plasticizer | | 0 |
| | Composition K | |
| Combustible | Ni | 27.40 (g) |
| | Al | 12.60 (g) |
| Filler | $MoSi_2$ | 20.00 (g) |
| | Fe | 5.30 (g) |
| | Cr | 30.00 (g) |
| | Mo | 1.60 (g) |
| | Nb | 1.17 (g) |
| | Y | 0.67 (g) |
| | Al | 1.00 (g) |
| Plasticizer | | 0 |
| | Composition L | |
| Combustible | Ni | 24.66 (g) |
| | Al | 11.34 (g) |
| Filler | $MoSi_2$ | 40.00 (g) |
| | Fe | 4.00 (g) |
| | Cr | 18.00 (g) |
| | Mo | 1.00 (g) |
| | Nb | 0.50 (g) |
| | Y | 0.50 (g) |
| Plasticizer | | 0 |
| | Composition M | |
| Combustible | Ni | 12.33 (g) |

-continued

| | | |
|---|---|---|
| | Al | 5.67 (g) |
| Filler | $MoSi_2$ | 75.00 (g) |
| | Fe | 1.50 (g) |
| | Cr | 2.50 (g) |
| | Al | 2.50 (g) |
| Plasticizer | | 0 |
| | Composition N | |
| Combustible | Ni | 12.33 (g) |
| | Al | 5.67 (g) |
| Filler | $MoSi_2$ | 75.00 (g) |
| | Fe | 3.00 (g) |
| | Cr | 2.50 (g) |
| | Al | 1.00 (g) |
| | B | 0.50 (g) |
| Plasticizer | | 0 |
| | Composition O | |
| Combustible | Ni | 17.13 (g) |
| | Al | 7.88 (g) |
| Filler | $MoSi_2$ | 70.00 (g) |
| | Fe | 2.50 (g) |
| | Cr | 1.00 (g) |
| | Al | 1.00 (g) |
| | B | 0.50 (g) |
| Plasticizer | | 0 |
| | Composition P | |
| Combustible | Ni | 17.13 (g) |
| | Al | 7.88 (g) |
| Filler | $MoSi_2$ | 75.00 (g) |
| Plasticizer | | 0 |
| | Composition Q | |
| Combustible | Ni | 13.70 (g) |
| | Al | 6.30 (g) |
| Filler | $MoSi_2$ | 70.00 (g) |
| | Ag | 10.0 (g) |
| Plasticizer | | 0 |
| | Composition R | |
| Combustible | $Cr_2O_3$ | 8.70 (g) |
| | Al | 3.05 (g) |
| | C | 0.89 (g) |
| Filler | $MoSi_2$ | 75.00 (g) |
| | $SiO_2$ | 10.00 (g) |
| | Si | 1.00 (g) |
| | SiC | 1.00 (g) |
| | B | 0.30 (g) |
| Plasticizer | Polyvinyl Butyral | 5.00 (g) |
| | Composition S | |
| Combustible | $Cr_2O_3$ | 15.50 (g) |
| | Al | 5.45 (g) |
| | C | 1.58 (g) |
| Filler | $MoSi_2$ | 65.00 (g) |
| | $SiO_2$ | 10.00 (g) |
| | Si | 1.00 (g) |
| | SiC | 1.00 (g) |
| | B | 0.50 (g) |
| Plasticizer | Polyvinyl Butyral | 5.00 (g) |
| | Composition T | |
| Combustible | $Cr_2O_3$ | 13.70 (g) |
| | Al | 4.80 (g) |
| | C | 1.40 (g) |
| Filler | $MoSi_2$ | 65.00 (g) |
| | $SiO_2$ | 10.00 (g) |
| | Si | 2.00 (g) |
| | SiC | 2.5 (g) |
| | B | 0.5 (g) |
| Plasticizer | Polyvinyl Butyral | 5.00 (g) |
| | Composition U | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 1.50 (g) |
| | $SiO_2$ | 8.00 (g) |
| | $Si_3N_4$ | 0.50 (g) |
| Plasticizer | 2.5% aqueous chemical cellulose solution | 15.00 (g) |
| | Composition V | |
| Combustible | $MoO_3$ | 17.10 (g) |
| | Al | 6.30 (g) |

-continued

| | | |
|---|---|---|
| | Si | 6.6 (g) |
| Filler | $MoSi_2$ | 60.00 (g) |
| | $SiO_2$ | 7.00 (g) |
| | BN | 0.50 (g) |
| | Cr | 0.70 (g) |
| | B | 0.30 (g) |
| | SiC | 1.5 (g) |
| Plasticizer | Polyvinyl Butyral | 10.00 (g) |
| | Composition W | |
| Combustible | $MoO_3$ | 7.85 (g) |
| | Al | 3.00 (g) |
| | Si | 3.15 (g) |
| Filler | $MoSi_2$ | 78.00 (g) |
| | $SiO_2$ | 4.80 (g) |
| | BN | 0.50 (g) |
| | Cr | 0.70 (g) |
| | B | 0.30 (g) |
| | SiC | 1.5 (g) |
| | Al | 0.5 (g) |
| | Si | 0.5 (g) |
| Plasticizer | Polyvinyl Butyral | 10.00 (g) |
| | Composition X | |
| Combustible | $MoO_3$ | 17.1 (g) |
| | Al | 6.30 (g) |
| | Si | 6.60 (g) |
| Filler | $MoSi_2$ | 6.00 (g) |
| | SiC | 61.50 (g) |
| | $SiO_2$ | 2.00 (g) |
| | $Si_3N_4$ | 0.50 (g) |
| Plasticizer | 2.5% aqueous ethyl cellulose solution | 15.00 (g) |
| | Composition Y | |
| Combustible | $MoO_3$ | 17.1 (g) |
| | Al | 6.3 (g) |
| | Si | 6.60 (g) |
| Filler | $MoSi_2$ | 60.00 (g) |
| | SiC | 2.00 (g) |
| Plasticizer | Bentonite | 8.00 (g) |
| | Composition Z | |
| Combustible | $MoO_3$ | 17.1 (g) |
| | Al | 6.3 (g) |
| | Si | 6.60 (g) |
| Filler | $MoSi_2$ | 60.00 (g) |
| | SiC | 1.5 (g) |
| | $Si_3N_4$ | 0.50 (g) |
| | $Y_2O_3$ | 3.00 (g) |
| Plasticizer | Bentonite | 5.00 (g) |
| | Composition AA | |
| Combustible | $MoO_3$ | 25.65 (g) |
| | Al | 9.45 (g) |
| | Si | 9.90 (g) |
| Filler | $MoSi_2$ | 50.00 (g) |
| | SiC | 1.0 (g) |
| Plasticizer | Bentonite | 4.00 (g) |
| | Composition BB | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 1.5 (g) |
| | $SiO_2$ | 8.0 (g) |
| | $Si_3N_4$ | 0.50 (g) |
| | $Y_2O_3$ | 3.00 (g) |
| Plasticizer | Polyvinyl Butyral | 15.00 (g) |
| | Composition CC | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 1.50 (g) |
| | $SiO_2$ | 8.00 (g) |
| | $Si_3N_4$ | 0.50 (g) |
| Plasticizer | Polyvinyl Butyral | 15.00 (g) |
| | Composition DD | |
| Combustible | $MoO_3$ | 17.1 (g) |
| | Al | 6.30 (g) |
| | Si | 6.60 (g) |
| Filler | $MoSi_2$ | 60.00 (g) |

-continued

| | | |
|---|---|---|
| | SiC | 1.50 (g) |
| | $ZrO_2$ | 8.00 (g) |
| | $Si_3N_4$ | 0.50 (g) |
| Plasticizer | Polyvinyl Butyral | 15.00 (g) |
| | Composition EE | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 1.50 (g) |
| | $Si_3N_4$ | 0.50 (g) |
| Plasticizer | Fused silica & equal volumetric amounts of colloidal alumina, zirconia and cerium acetate | 10.00 (g) |
| | Composition FF | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 1.50 (g) |
| | $Si_3N_4$ | 0.50 (g) |
| | Silica | 8.00 (g) |
| Plasticizer | Liquid Silica & equal volumetric amounts of colloidal alumina, zirconia and cerium acetate | 10.00 (g) |
| | Composition GG | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 1.50 (g) |
| | $Si_3N_4$ | 0.50 (g) |
| | $Y_2O_3$ | 3.00 (g) |
| Plasticizer | Silica equal volumetric amounts of colloidal alumina, zirconia and cerium acetate | 10.00 (g) |
| | Composition HH | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 9.50 (g) |
| | $Si_3N_4$ | 0.50 (g) |
| Plasticizer | Polyvinyl Butyral | 15.00 (g) |
| | Composition II | |
| Combustible | $MoO_3$ | 17.1 (g) |
| | Al | 6.30 (g) |
| | Si | 6.60 (g) |
| Filler | $MoSi_2$ | 60.00 (g) |
| | SiC | 9.50 (g) |
| | $Si_3N_4$ | 0.50 (g) |
| Plasticizer | "750 Cotronics"* fused Silica & activator | 15.00 (g) |
| | Composition JJ | |
| Combustible | $MoO_3$ | 28.50 (g) |
| | Al | 10.50 (g) |
| | Si | 11.00 (g) |
| Filler | SiC | 40.00 (g) |
| Plasticizer | Bentonite | 10.00 (g) |
| | Composition KK | |
| Combustible | $MoO_3$ | 22.80 (g) |
| | Al | 8.40 (g) |
| | Si | 8.80 (g) |
| Filler | SiC | 40.00 (g) |
| | $Y_2O_3$ | 8.00 (g) |
| | $Si_3N_4$ | 2.00 (g) |
| Plasticizer | Bentonite | 10.00 (g) |
| | Composition LL | |
| Combustible | $MoO_3$ | 22.80 (g) |
| | Al | 8.40 (g) |
| | Si | 8.80 (g) |
| Filler | SiC | 40.00 (g) |
| | $Y_2O_3$ | 8.00 (g) |

-continued

| | | |
|---|---|---|
| | $Si_3N_4$ | 2.00 (g) |
| | $SiO_2$ | 10.00 (g) |
| Plasticizer | 2.5% aqueous ethyl cellulose solution | 10.00 (g) |
| | Composition MM | |
| Combustible | $Cr_2O_3$ | 27.60 (g) |
| | Al | 9.60 (g) |
| | C | 2.80 (g) |
| Filler | SiC | 40.00 (g) |
| | $Y_2O_3$ | 8.00 (g) |
| | $Si_3N_4$ | 2.00 (g) |
| | $SiO_2$ | 10.00 (g) |
| Plasticizer | 2.5% aqueous ethyl cellulose solution | 10.00 (g) |
| | Composition NN | |
| Combustible | Ni | 34.68 (g) |
| | Al | 5.32 (g) |
| Filler | SiC | 40.00 (g) |
| | $Y_2O_3$ | 10.00 (g) |
| | $Al_2O_3$ | 2.00 (g) |
| | $SiO_2$ | 6.00 (g) |
| | MgO | 2.00 (g) |
| Plasticizer | 2.5% aqueous ethyl cellulose solution | 10.00 (g) |
| | Composition OO | |
| Combustible | Ni | 21.67 (g) |
| | Al | 3.33 (g) |
| Filler | SiC | 40.00 (g) |
| | Fe | 15.00 (g) |
| | Cr | 3.00 (g) |
| | Al | 1.00 (g) |
| | $Y_2O_3$ | 8.00 (g) |
| | $Al_2O_3$ | 2.00 (g) |
| | $SiO_2$ | 6.00 (g) |
| Plasticizer | 2.5% aqueous ethyl cellulose solution | 10.00 (g) |
| | Composition PP | |
| Combustible | Ti | 29.60 (g) |
| | Si | 10.40 (g) |
| Filler | SiC | 40.00 (g) |
| | $Y_2O_3$ | 8.00 (g) |
| | $Al_2O_3$ | 2.00 (g) |
| | $SiO_2$ | 8.00 (g) |
| | MgO | 2.00 (g) |
| Plasticizer | 2.5% aqueous ethyl cellulose solution | 10.00 (g) |
| | Composition QQ | |
| Combustible | $MoO_3$: | 22.80 (g) |
| | Al | 8.40 (g) |
| | Si | 8.80 (g) |
| Filler | $MoSi_2$ | 10.00 (g) |
| | SiC | 50.00 (g) |
| Plasticizer | 2.5% ethyl cellulose in water | 15.00 (g) |
| | Composition RR | |
| Combustible | $MoO_3$ | 22.80 (g) |
| | Al | 8.40 (g) |
| | Si | 8.80 (g) |
| Filler | $MoSi_2$ | 10.00 (g) |
| | SiC | 40.00 (g) |
| Plasticizer | Bentonite | 10.00 (g) |
| | Composition SS | |
| Combustible | $MoO_3$ | 22.80 (g) |
| | Al | 8.40 (g) |
| | Si | 8.80 (g) |
| Filler | $Si_3N_4$ | 10.00 (g) |
| | SiC | 40.00 (g) |
| Plasticizer | Bentonite | 10.00 (g) |
| | Composition TT | |

-continued

| | | |
|---|---|---|
| Combustible | $MoO_3$ | 19.95 (g) |
| | Al | 7.35 (g) |
| | Si | 7.70 (g) |
| Filler | $Y_2O_3$ | 10.00 (g) |
| | SiC | 40.00 (g) |
| Plasticizer | Bentonite | 15.00 (g) |
| | Composition UU | |
| Combustible | $MoO_3$ | 17.10 (g) |
| | Al | 9.10 (g) |
| | Si | 8.80 (g) |
| Filler | $Y_2O_3$ | 10.00 (g) |
| | SiC | 25.00 (g) |
| | $MoSi_2$ | 20.00 (g) |
| Plasticizer | Bentonite | 10.00 (g) |
| | Composition VV | |
| Combustible | $MoO_3$ | 19.95 (g) |
| | Al | 7.35 (g) |
| | Si | 12.50 (g) |
| Filler | $Y_2O_3$ | 10.00 (g) |
| | SiC | 40.00 (g) |
| Plasticizer | Bentonite | 10.00 (g) |
| | Composition WW | |
| Combustible | $MoO_3$ | 14.25 (g) |
| | Al | 11.30 (g) |
| | Si | 11.60 (g) |
| Filler | $Y_2O_3$ | 10.00 (g) |
| | SiC | 40.00 (g) |
| Plasticizer | Bentonite | 10.00 (g) |
| | Composition XX | |
| Combustible | $MoO_3$ | 19.95 (g) |
| | Al | 7.35 (g) |
| | Si | 7.70 (g) |
| Filler | $Y_2O_3$ | 10.00 (g) |
| | SiC | 25.00 (g) |
| | $MoSi_2$ | 20.00 (g) |
| Plasticizer | Bentonite | 10.00 (g) |
| | Composition YY | |
| Combustible | $MoO_3$ | 17.10 (g) |
| | Al | 9.00 (g) |
| | Si | 3.40 (g) |
| Filler | $Y_2O_3$ | 10.00 (g) |
| | SiC | 35.00 (g) |
| | $Al_2O_3$ | 10.00 (g) |
| | B | 0.50 (g) |
| Plasticizer | Bentonite | 15.00 (g) |
| | Composition ZZ | |
| Combustible | $MoO_3$ | 17.10 (g) |
| | Al | 6.30 (g) |
| | Si | 16.00 (g) |
| Filler | $Y_2O_3$ | 5.60 (g) |
| | SiC | 35.00 (g) |
| | $Al_2O_3$ | 5.00 (g) |
| | B | 0.50 (g) |
| Plasticizer | Bentonite | 15.00 (g) |
| | Composition AAA | |
| Combustible | $MoO_3$ | 19.95 (g) |
| | Al | 7.35 (g) |
| | Si | 37.20 (g) |
| | C | 10.50 (g) |
| Filler | $Al_2O_3$ | 10.00 (g) |
| | B | 1.00 (g) |
| Plasticizer | Bentonite | 15.00 (g) |

*from Cotronics Corp., 3379 Shore Pkwy., Brooklyn, NY 11235.

Processing in accordance with the invention may include the following procedures:

Process I

Step 1. The heating element was manufactured in accordance with the '782 application.

Step 2. Powders and bentonite were weighed according to desired compositions.

Step 3. The weighed powders and bentonite were mixed in water by ball milling for 2–10 hours with $ZrO_2$ milling media.

Step 4. This thin slurry was moved to a large glass container, dried in a 100° C. oven, and the water was allowed to evaporate.

Step 5. Dried powder was ground in a mortar for one hour and water was added to this powder to form a thick slurry.

Step 6. This thick slurry was ground for one hour to form a plastic mass.

Step 7. This plastic mass was forced through a piston extrusion machine with high pressure and vacuum to produce wires.

Step 8. The extruded wires are cut into the desired length. This now forms the wet and uncombusted terminal.

Step 9. The fired heating element from step 1 is forced into the wet and uncombusted terminal wire. A hole may be made in the terminal before placing the element, however the wet terminal is in a pliable state, allowing the forcing of the terminal wire. Normally the terminal diameter is chosen such that it is 2 to 3 times more than the diameter of the heating element. E.g., for a 1 mm diameter heating element wire we choose a 3 mm wet diameter terminal.

Step 10. The terminal-element is dried in air for 2–4 hours (these wires were no longer flexible at this time), and then dried at 110° in the oven, for 2–5 hours.

Step 11. The terminal is then combusted by a torch.

Process II

Step 1. The heating element was manufactured in accordance with the '782 application.

Step 2. Powders and polyvinyl butyral were weighed according to desired compositions.

Step 3. The weighed powders and polyvinyl butyral were mixed in acetone by ball milling for 2–10 hours with $ZrO_2$ milling media.

Step 4. The thin slurry was then transferred to a large glass container, dried in a 70° oven, and solvent was allowed to evaporate.

Step 5. Dried powder was ground in a mortar for one hour and acetone was added to this powder to form a thick slurry.

Step 6. This thick slurry was ground for one hour to form a plastic mass.

Step 7. This plastic mass was forced through a piston extrusion machine with high pressure and vacuum to produce wires.

Step 8. The extruded wires are cut into the desired length. This now forms the wet and uncombusted terminal.

Step 9. The fired heating element from step 1 is forced into the wet and uncombusted terminal wire. A hole may be made in the terminal before placing the element, however the wet terminal is in a pliable state, allowing the forcing of the terminal wire.

Step 10. The terminal element is dried in air for 2–4 hours (these wires were no longer flexible at this time), and then dried in an oven at 110° C. for 2–5 hours.

Step 11. The terminal is then combusted by a torch.

Process III

Step 1. The heating element was manufactured in accordance with the '782 application.

Step 1. Powders and polyvinyl butyral were weighed according to desired compositions.

Step 2. The weighed powders and polyvinyl butyral were mixed in acetone by ball milling for 2–10 hours with $ZrO_2$ milling media.

Step 3. This thin slurry was moved to a large glass container, and dried in a 70° C. oven. Acetone was allowed to evaporate.

Step 4. Dried powder was ground in a mortar for one hour.

Step 5. This powder was pressed in a die to form various kinds of samples, for instance, sandwich samples.

Step 6. The products were combusted in a furnace with air or argon atmosphere in the temperature range of 1500°–12500° C.

Process IV

Step 1. The heating element was manufactured in accordance with the '782 application.

Step 1. Powders and polyvinyl butyral were weighed according to desired compositions.

Step 2. The weighed powders and polyvinyl butyral were mixed in acetone by ball milling for 2–10 hours with a $ZrO_2$ milling media.

Step 3. This thin slurry was moved to a large glass container, and dried in a 700° C. oven. The solvent was allowed to evaporate.

Step 4. Dried powder was ground in a mortar for one hour, and acetone was added to this powder to form a thin slurry.

Step 5. This thin slurry was mixed mechanically for another hour to form a slip.

Step 6. This slurry was cast in a die to form products with various shapes.

Step 7. The sample from step 6 was dried in air for about 10 hours, and then heated at 250° C. in an oven.

Step 8. This sample was combusted in a furnace with air or argon atmosphere in the temperature range of 150°–1250° C.

Process V

Step 1. The heating element was manufactured in accordance with the '782 application.

Step 1. Powders were weighed according to desired compositions.

Step 2. The weighed powders were mixed in acetone by ball milling for 2–10 hours with a $ZrO_2$ milling media.

Step 3. Mixed powders were ground in a mortar for one hour.

Step 4. This powder was pressed in a die to form various kinds of samples, for instance, sandwich sample, dog bone shaped samples, etc.

Step 5. The products were combusted in a furnace in air or argon atmosphere in the temperature range of 150°–1250° C.

Process VI

Step 1. The heating element was manufactured in accordance with the '782 application.

Step 2. "750 Cotronics" fused silica was ball milled for two days and then sized by −325 mesh sieve.

Step 3. Powders and sieved "750 Cotronics" fused silica were weighed according to desired compositions.

Step 4. The weighed powders and fused silica were mixed in water by ball milling for 2–10 hours with $ZrO_2$ milling media.

Step 5. The thin slurry was moved to a large glass container, dried in a 100° C. oven, and the water was allowed to evaporate.

Step 6. The dried powder was ground in a mortar for one hour, and liquid silica activator was added to the powder to form a thick slurry.

Step 7. The thick slurry was ground for 30 minutes to form a plastic mass.

Step 8. The plastic mass was forced through a piston extrusion machine with high pressure and vacuum to produce wires.

Step 9. The extruded wires are cut into the desired shape. This now forms the wet and uncombusted terminal wire.

Step 10. The fired heating element from step 1 is forced into the wet and uncombusted terminal wire. A hole may be made in the terminal before placing the element, however the terminal is in a pliable state, allowing the forcing of the terminal.

Step 11. The terminal-element is dried in air for 2–4 hours (these wires were no longer flexible at this time), and then dried at 110° in the oven, for 2–5 hours.

Step 12. The terminal is then combusted by a torch

Process VII

Step 1. The heating element was manufactured in accordance with the '782 application.

Step 2. Powders were weighed according to desired compositions.

Step 3. The weighed powders were mixed in water by ball milling for 2–10 hours with $ZrO_2$ milling media.

Step 4. The thin slurry was moved to a large glass container, dried in a 110° C. oven, and water was allowed to evaporate.

Step 5. The dried powder was ground in a mortar for one hour and 2.5 wt % chemical cellulose solution in water was added to this powder to form a thick slurry.

Step 6. This thick slurry was ground for another hour to form a plastic mass.

Step 7. The plastic mass was forced through a piston extrusion machine with high pressure and vacuum to produce wires.

Step 8. The extruded wires are cut into the desired shape. This now forms the wet and uncombusted terminal wire.

Step 9. The fired heating element from step 1 is forced into the wet and uncombusted terminal wire. A hole may be made in the terminal before placing the element, however the terminal is in a pliable state, allowing the forcing of the terminal.

Step 10. The terminal element is dried in air for 2–4 hours (these wires were no longer flexible at this time), and then dried in an oven at 110° C. for 2–5 hours.

Step 11. The terminal is then combusted by a torch.

Process VIII

Step 1. The heating element was manufactured in accordance with the '782 application.

Step 1. Powders were weighed according to desired compositions.

Step 2. The weighted powders were mixed in water by ball milling for 2–10 hours with $ZrO_2$ milling media.

Step 3. This thin slurry was moved to a large glass container, dried in a 100° oven, and the water was allowed to evaporate.

Step 4. Dried powder was ground in a mortar for one hour and 2.5 weight percent aqueous chemical cellulose solution was added to this powder to form a slurry.

Step 5. This slurry was ground for a half hour to form a homogenous mass.

Step 6. This mass was slip cast by molding to form different shapes, e.g., cast plates, or by pressing the mass to form plates, or by working the mass with clay-sculpturing tools to obtain a shape.

Step 7. The green articles from step 6 were dried in air for 2–19 hours (these articles were no longer flexible at this time), and dried at 110° C. in an oven for 2–5 hours.

Step 8. The articles were combusted in a furnace with air or argon atmosphere in the temperature range of 750°–1250° C.

Final products were prepared in accordance with the following non-limiting examples:

EXAMPLE 1

Composition U and Process II were used to make heating elements. The final products (1–10 mm wires) showed very high strength at room temperature and could be used as high temperature heating elements. Samples were run at 1600° C. for 40 hours without any degradation.

EXAMPLE 2

Composition W and Process I were used to make an electrical heating element.

After combustion, the products showed excellent room temperature strength. According to this invention, this high room temperature strength comes not only from filler reaction joining among $SiO_2$, $MoSi_2$, SiC and the reaction product $Al_2O_3$, but also from reaction bonding between $MoSi_2$ reaction products and these fillers. It was found that an increase of the combustible ($MoO_3+2Al+2Si$) content up to a value of 45% by weight of the total composition substantially enhanced the room temperature strength. But if this combustible content were more than 50% by weight, the combustion reaction would become too strong, so that the final products were broken and cracks could form on the surface of the products. The adiabatic temperature of $MoO_3+2Al+2Si$ reaction is as high as 3300K., which is higher than the melting point of $MoSi_2$. In this reaction, therefore, at least 50% filler and plasticizer were necessary. According to this embodiment, the $MoO_3+2Al+2Si$ reaction is extremely useful in making high temperature heating elements, and oxidation resistance composites. In addition, the fillers such as $Y_2O_3$ and $Al_2O_3$, enhance sintering during combustion. It is essential, in order to obtain the best products, that different particle sizes be used in the sample. The products made from the processing were in the form of wires 1 mm–10 mm in diameter or flat plate 5 mm thick.

These products could be used at high temperatures. Testing was carried out between 1200° and 1600° C. The sample surface was noted to be coated with a protective layer of $SiO_2$due to the reaction between $MoSi_2$ and oxygen. This thin quartz layer also sealed any of the pores on the surface. On account of the formation of this silica layer the product could be used at high temperatures. The wires were tested in the form of heating elements by passing 5–50 amps through the wires for long times and allowing the samples to attain temperatures between 1200° C. and 1600° C. At 1600° C. the wire ran for 100 hours without any sign of deterioration. The test was discontinued because of the terminals becoming too hot. At 1200° C. the samples ran for over 1400 hours, and the test is still continuing. In this test the terminals were cooled with cooling water. The room temperature resistivity of these samples averaged 90 micro ohm cm before the test and remained 90 micro ohm cm after 1400 hours when the test was briefly interrupted.

EXAMPLE 3

Composition M and Process IV were used to make a sandwich sample. A sandwich sample is one which contains layers of different compositions of pressed powders or slurry. A powder mixture with 69 grams of $Cr_2O_3$, 24 grams of Al and 7 grams of carbon were mixed as a combustible source and used as the core of the sandwich. Samples were pressed into a sandwich. After combustion, the core of the sandwich is a composite of $Cr_2O_3$ and $Al_2O_3$ which are porous materials and insulators. The two outside layers were the composite resulting from Composition M. This sample showed high strength for this kind of product. When used as a heating element the sample was noted to remain stable at 1300° C.

EXAMPLE 4

Composition Y and Process I were used to make heating elements. The $ZrO_2$ (partially stabilized) is advantageous in reinforcing $MoSi_2$ since its coefficient of thermal expansion is close to that of $MoSi_2$. It was found that partially stabilized $ZrO_2$ significantly toughened $MoSi_2$, and the final products could be used at temperatures up to 1600° C.

EXAMPLE 5

Composition R and Process I were used to make heating elements. The properties of the final products were comparable to those of Example 1. However, the combustion temperature is lower than that of Composition W used in Example 1.

EXAMPLE 6

Composition Z and Process VI were used to make heating elements. The fused silica was ball milled for 2 days to decrease the particle size to less than 40 micrometers before mixing with the other powdered material. The fused silica and activator functioned very well as a plasticizer. The plastic mass could be extruded into shapes of various kinds. After drying in air and an oven at 110° C., the samples showed good green strength. The green samples were combusted in the range of 750° to 1200° C. Final products exhibited excellent room temperature strength and could be used as high temperature heating elements in the range of 1000° to 1700° C.

EXAMPLE 7

Composition V and Process II were used to make heating elements. The combustible material comprised 45% by weight of the total composition. The combustion temperature was higher than that noted in compositions having 40% or less combustible material. Composition V could be ignited at relatively low temperatures, on the order of 750°-950° C. At such temperature levels crack-free products were obtained. The final products had very high room temperature strength and could be used as high temperature heating elements.

EXAMPLE 8

Composition R and Process I were used to make heating elements. However, extra Al and Si in the combustible, and Cr and B in the filler, were added to increase the density of the composition. It is believed that the B addition may decrease the melting point of the $SiO_2$ in the mixture, so that the products may be liquid sintered during the combustion step.

EXAMPLE 9

Composition E and Process VI were used to make heating elements (with omission of steps 1 and 2 since Composition E contained no plasticizer). Samples were combusted in the temperature range of 1000° C. to 1150° C. The final products showed reasonable room temperature strength and could be used as heating elements at temperatures of 500°-900° C.

EXAMPLE 10

Composition AA and Process VI were used to make high temperature heating elements. Pure $SiO_2$ powder was used as the plasticizer, with 750 Cotronics" liquid silica activator. Since impurities were reduced in the final products by use of pure $SiO_2$, the working temperature range of the heating elements was raised.

EXAMPLE 11

Composition BB and Process VI were used to make high temperature heating elements, again with pure $SiO_2$ powder and "750 Cotronics" liquid silica activator. These were found to work very well as a plasticizer. The working temperature of the heating elements was increased in comparison to products using bentonite as a plasticizer, due to reduction of the impurity phase.

EXAMPLE 12

Composition CC and Process I were used to make high temperature heating elements and oxidation resistant composites. SiC was used (in place of $SiO_2$) in this composition as part of the filler material, and it was found that the final products could be used at temperatures as high as 1700° C.

EXAMPLE 13

Composition DD, or Composition JJ, and Process VII were used to make plate-like heating elements and oxidation resistant composite articles. The final products showed improved room temperature strength and could be used as heating elements in room heaters in place of conventional alloy heating elements or ceramic heating elements. The resistivity of the element prepared from Composition DD was measured at room temperature and found to be 0.2 ohm cm.

Average particle sizes used in the above examples, obtained from commercially available sources, are set forth in Table II. No representation is made that these particle sizes are optimum, but they were found to be operable and hence constitute the best mode now known of carrying out the invention.

TABLE I

| Average Particles Sizes | |
|---|---|
| Ni:3 micron (μ) | Cr: −325 mesh (~44μ) |
| $MoSi_2$:3μ | C: −300 mesh (60μ) |
| Fe: −200 mesh (74μ) | MgO: −325 mesh (~44μ) |
| Nb: −325 mesh (~44μ) | Si: −325 mesh (~44μ) |
| Al: −325 mesh (~44μ) | $Cr_2O_3$: −325 mesh (~44μ) |
| $SiO_2$: −325 mesh (~44μ) | SiC:1μ |
| $Si_3N_4$:0.1-3μ | $Y_2O_3$:2μ |
| $Al_2O_3$: −325 mesh (~44μ) | B:Submicron, amorphous |
| Ti: −325 mesh (~33μ) | |

Figure 2:
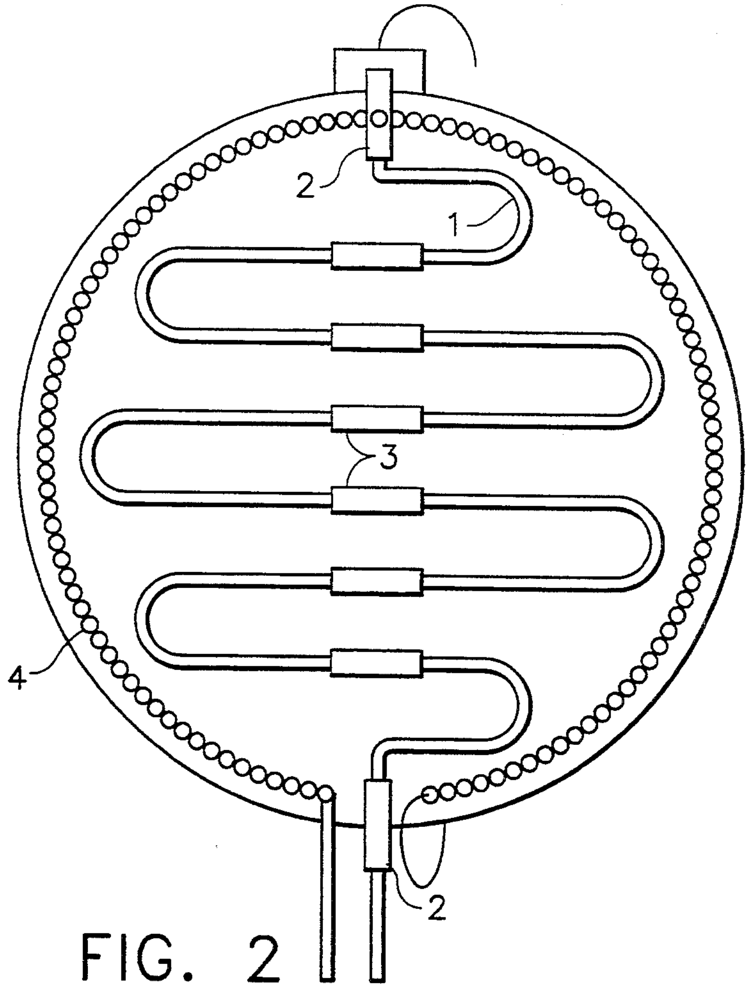
FIG. 2 is a schematic plan view which shows a heating device with a particular arrangement of heating elements, terminals and intermediate terminals.
Figure 3:
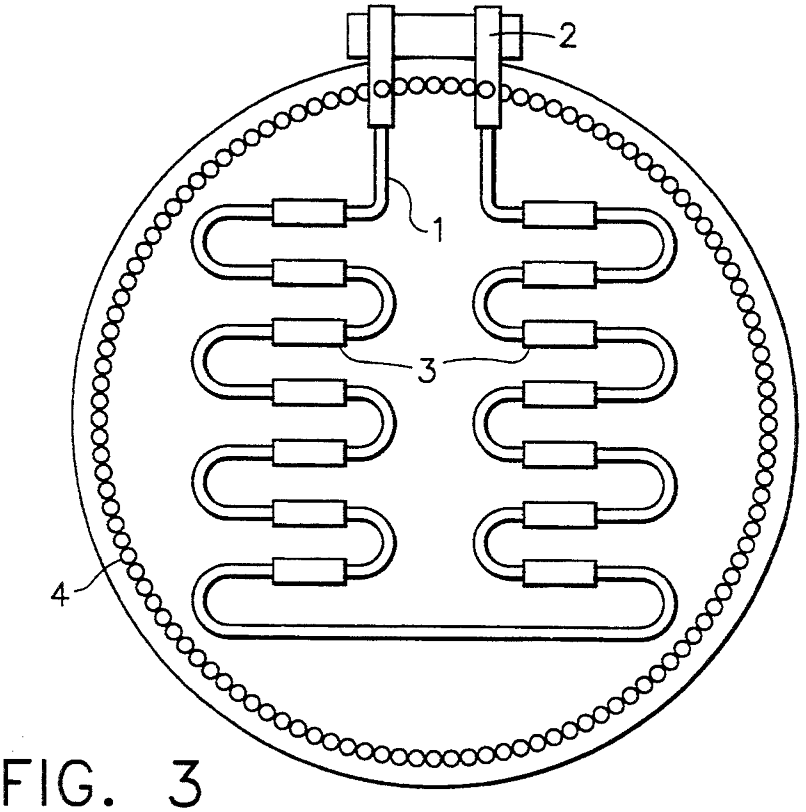
FIG. 3 is a schematic plan view which shows a heating device with a second arrangement of heating elements, terminals and intermediate terminals.
Figure 4:
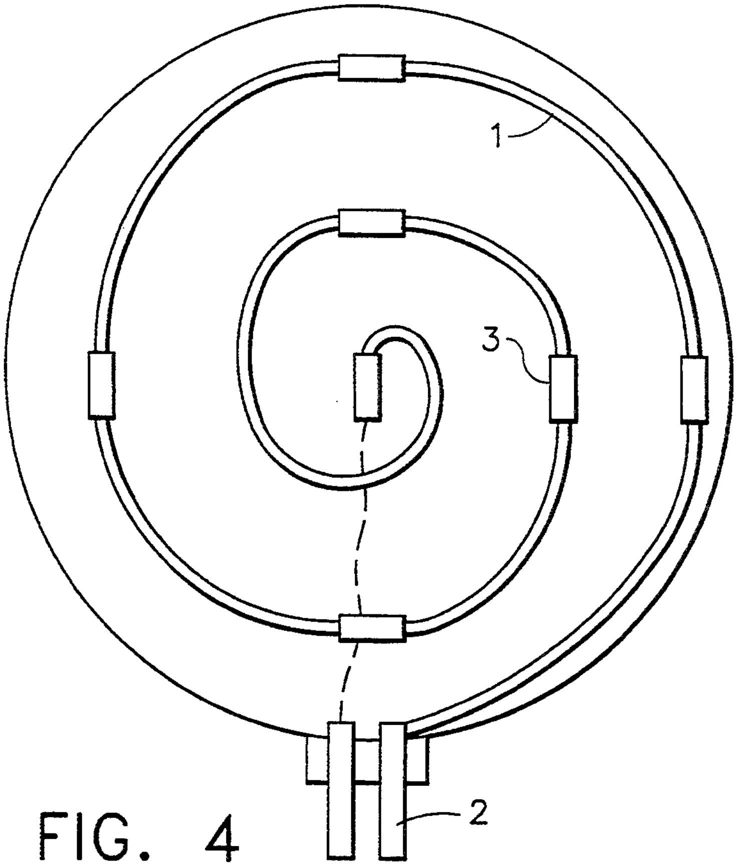
FIG. 4 is a schematic plan view which shows a heating device with a third arrangement of heating elements, terminals and intermediate terminals.

FIGS. 2, 3 and 4 show novel heating element assemblies in accordance with one aspect of the present invention. the terminal is depicted generally by the numeral 1, the heating elements by 2 and the coolers by 3. The coolers 3 are intermediate terminals which because they remain cooler than the elements, may be used for joining the heating elements assembly to the surface of the radiant heater below the radiant heater assembly. Also shown generally by the numeral 4 is a "balance" which is usually in the form of a metallic heating element and performs the function of keeping the resistivity of the entire heating device at a desired value. A "balance" may be optionally used in series with the heating elements if required.

We claim:

1. A method for joining a ceramic or metal ceramic electrical heating element to a electrical terminal, the heating elements having been manufactured using micropyretic synthesis, the method for joining comprising the steps of:

(1) preparing the electrical terminals by (a) blending a mixture comprising between about 5% and 95% by weight of at least one reactive system, wherein said reactive system comprises at least two particulate combustible materials which will react exothermically with one another by micropyretic synthesis and are present in such proportion to one another that combustion will occur when ignited, upto 95% by weight of a filler material, and a sufficient amount of a liquid phase in order to form a slurry and (b) fashioning said slurry into a desired wet and uncombusted shape for said terminal;

(2) placing said heating element into close contact with said wet, uncombusted terminal so as to attach said terminal to said element;

(3) drying the terminal portion of the terminal-element attachment; and (4) combusting the terminal portion of said terminal-element attachment by ignition at a temperature between about 150° C. and 1800° C.

2. The method according to claim 1, wherein said reactive system is selected from the group consisting of Ni and Al, $Cr_2O_3$ and Al and C, $MoO_3$ and Al and B, $MoO_3$ and Ai and Si,Ti and B, Ti and Si, Nb and Al, Zr and B, Nb and B, $Fe_2O_3$ and Al, $Cr_2O_3$ and Al,Ti and B and Al, Hf and B,Ta and B,Ti and C,Ti and Ni,Ti and Pd,Ti and Al,Ti and Fe,Ti and C and Ni and combinations thereof.

3. The method according to claim 1, wherein said filler material is selected from the group consisting of: SiC, $MoSi_2$, $Cr_2C_3$, WC, $Al_2O_3$, $SiO_2$, $SnO_2$, C, Be, La, Co, Ni, rare earth elements from the Lanthanide series with atomic numbers from 57 to 71, ZnO, $Y_2O_3$, $ZrO_2$, Cu, Ni alloys containing Al and Ti, Co alloys containing Al and Ti, Ni-Co alloys containing Al and Ti, $Sb_2O_3$, CuO, $Fe_2O_3$, GeO, $Fe_3O_4$, $V_2O_5$, FeO, Mo, Nb, Cr, Al, Si, Y, Fe, $Si_3N_4$, B, alloys and mixtures thereof.

4. The composition according to claim 1 wherein said liquid phase comprises up to 90% by weight of a plasticizer.

5. The method according to claim 4, wherein said plasticizer is selected from the group consisting of: polyvinyl butyral, polyurethane, colloidal silica, 2-5% aqueous ethyl cellulose solution, phosphoric acid, bentonite, and a mixture of fused silica with equal volumetric amounts of colloidal alumina, zirconia and cerium acetate.

6. The method according to claim 5, wherein said solvent is selected from the group consisting of: acetone, water and acetone-water.

7. The method according to claim 6, wherein said mixture comprise from about 20% to about 85% of said filler material, about 15% to about 85% of said reactive system, and 0% to about 25% of said plasticizer by weight, based on the total weight of said mixture.

* * * * *